United States Patent [19]

Boase et al.

[11] 3,877,627

[45] Apr. 15, 1975

[54] PINCH ROLLER/CAPSTAN WEB DRIVE

[75] Inventors: Elmer E. Boase; Anthony P. Di Fulvio, both of Rochester, N.Y.

[73] Assignee: Eastman Kodak Company, Rochester, N.Y.

[22] Filed: Oct. 26, 1973

[21] Appl. No.: 410,080

[52] U.S. Cl. .................... 226/33; 226/35; 226/154; 226/187; 226/195

[51] Int. Cl. .............................................. B65h 17/20

[58] Field of Search ......... 226/33, 34, 35, 154, 155, 226/176, 177, 181, 186, 187, 195

[56] References Cited

UNITED STATES PATENTS

| | | | |
|---|---|---|---|
| 2,499,699 | 3/1950 | Tinkham | 226/155 X |
| 3,176,895 | 4/1965 | Kurth | 226/176 |
| 3,754,695 | 8/1973 | Suzuki | 226/181 X |

*Primary Examiner*—Richard A. Schacher
*Attorney, Agent, or Firm*—L. P. Kessler

[57] ABSTRACT

A pinch roller/capstan mechanism for driving a web, the mechanism being capable of accurately stopping web movement at a desired location. In order to accomplish accurate web stopping, the web is interposed between a pinch roller and an idler roller, the pinch roller being supported in operative engagement with a drive capstan to positively control web movement. The pinch roller is mounted for limited movement relative to the idler roller, with its axis oriented to be parallel to the axes of the capstan and the idler roller but displaced to the upstream side of an imaginary line joining the capstan and idler roller axes. This positioning results in any downstream tension inducing forces on the web tending to increase the pinch roller loading on the web to increase the grip thereon to prevent slippage. The diameter of the capstan is selected so that a preselected operating time of the capstan drive will cause a specific linear travel of the web, the travel distance being equal to the distance from a station for sensing an index mark on the web and the location at which the web is to be accurately stopped.

5 Claims, 4 Drawing Figures

PINCH ROLLER/CAPSTAN WEB DRIVE

BACKGROUND OF THE INVENTION

1. Field of the Invention

This invention relates to web driving devices and more particularly to a pinch roller/capstan type drive capable of accurately stopping a web at a desired location.

2. Description of the Prior Art

In the transport of webs, particularly the type bearing information, it is often desirable to have the capability of moving the web at a rapid speed and stopping the web accurately at a desired location. An example of an arrangement where high web driving speed and stopping accuracy are desired is in the retrieval of informational items stored on microfilm. The microfilm may be driven at relatively high velocities of 100 to 200 feet per minute and may have thousands of bits of information recorded thereon. In order to have rapid access to the information on the film, code responsive retrieval systems have been developed which electronically scan rapidly moving film to give indication of the existence of desired items of information so that the film can be stopped to view the particular desired informational item without the tedious job of searching each individual item by human inspection.

By way of illustrative example, U.S. Pat. No. 3,290,987 issued Dec. 13, 1966 to James et al shows an optical scanning device which reads codes representative of each item on a rapidly moving web of microfilm. When an item desired to be retrieved is noted by the scanning device, a signal is sent to the film drive mechanism to stop the film. However, due to the inertia of the film drive mechanism, it is difficult to accomplish accurate positioning of the desired item in a projection gate. The James et al arrangement accomplishes positioning by determining how far past the gate the desired item has traveled and then reversing the film movement to put the desired item in the gate.

SUMMARY OF THE INVENTION

It is therefore a primary object of this invention to provide a web transport mechanism capable of accurately stopping a moving web, the mechanism not being adversely affected by downstream forces on the web when stopping of the web is to be accomplished.

Moreover, it is an object of this invention to provide a web transport mechanism which utilizes any downstream tension inducing forces on the web to apply a braking action to prevent slippage and thus aid in accurately stopping the web.

Accordingly, there is herein provided a web transport mechanism having a pinch roller and idler roller arranged to have a web interposed therebetween, the pinch roller being in operative engagement with a drive capstan to positively control web drive. The pinch roller is mounted for limited movement relative to the idler roller, with its axis oriented to be parallel to the axes of the capstan drive and the idler roller but displaced to the upstream side of the imaginary line joining the capstan and idler roller axes. This particular positioning results in any downstream tension inducing forces on the web tending to increase the pinch roller loading on the web to increase the braking grip thereon to prevent slippage. The diameter of the capstan is selected so that a preselected operating time of the capstan drive will cause a specific linear travel of the web, the travel distance being equal to the distance between a station for sensing an index mark on the web and the desired location at which the web is to be accurately positioned.

DESCRIPTION OF THE PREFERRED EMBODIMENT

Figure 1:
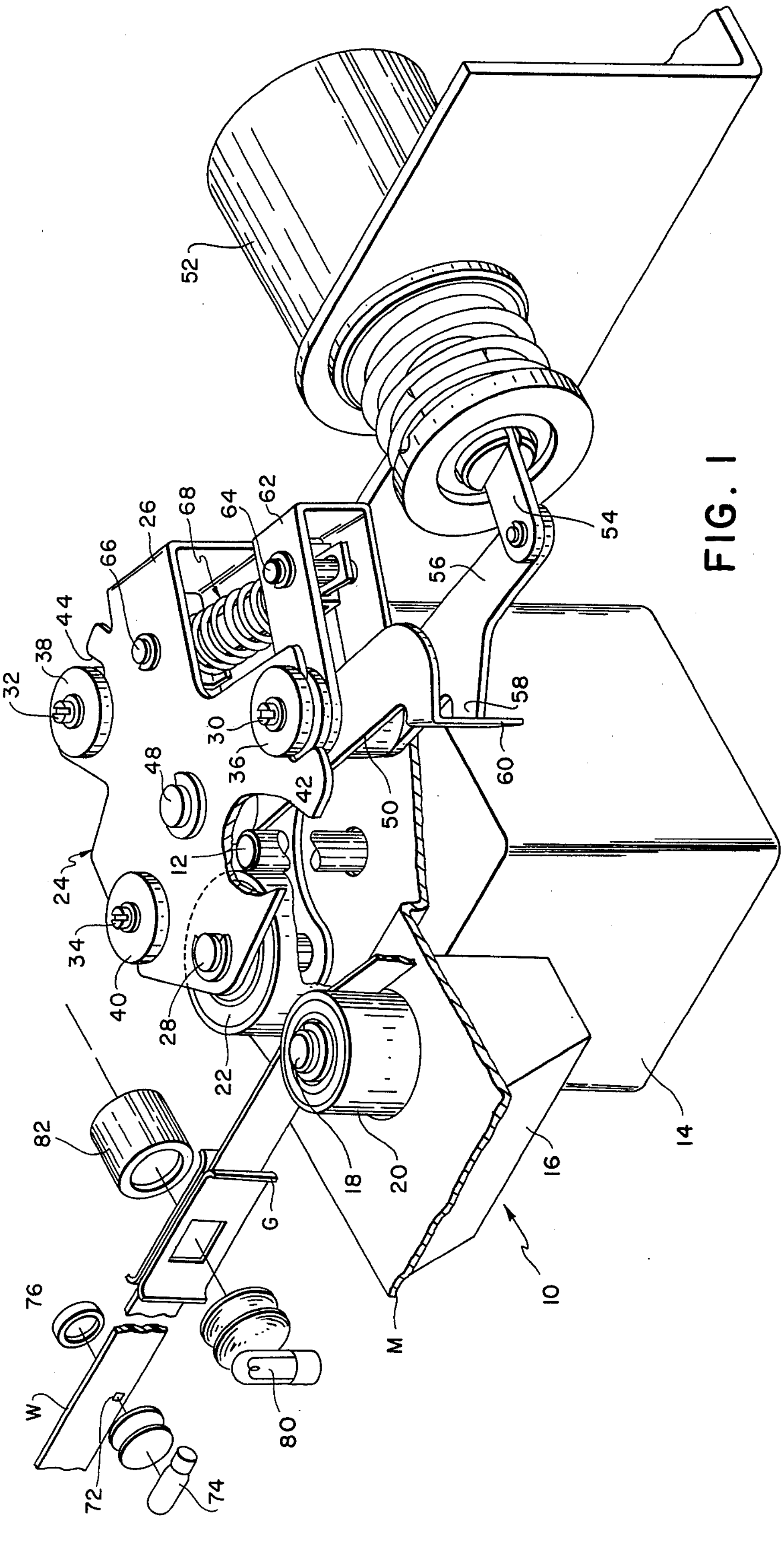
FIG. 1 is a perspective view of the pinch roller/capstan drive mechanism according to this invention.

Referring now to the drawings, the web drive mechanism 10 is comprised of a capstan 12 which is driven by a stepper motor 14 carried by a main frame M. The motor 14 drives the capstan 12 at a constant average rotational speed as a result of the application of a constant frequency train of electrical pulses to the motor 14. A housing 16 extending from the main frame M supports a shaft 18 upon which an idler roller 20 is mounted for free rotation. A pinch roller 22, operatively engaged for selective rotation with the capstan 12, is movable from a non-web-driving position (FIG. 2) removed from the web travel path into driving engagement with a web W (FIG. 3) adjacent the web path, in the manner to be explained hereinbelow. The web W is interposed between the rollers 22 and 20 so that application of pressure between the rotating pinch roller 22 and idler roller 20 on the web will control movement of the web.

In order to permit the pinch roller 22 to be movable between its driving and non-driving positions, the roller is supported by a frame 24. The frame 24 is comprised of a generally U-shaped member 26 which carries a shaft 28 upon which the pinch roller 22 is rotatably mounted. The frame 24 is supported on a shaft 48 which is carried by a lever 50. The lever 48 is mounted for pivotable movement about a post 30. To help stabilize movement of the frame 24, posts 30, 32 and 34 carried by the main frame M extend through corresponding notches 42, 44 and 46 in frame 24 and are provided with respective washer sets 36, 38 and 40 which engage the peripheral surfaces of the notches. The notches 42, 44 and 46 permit the member 26 to be moved, within limits, relative to the posts 30, 32 and 34.

Figures 3, 4:
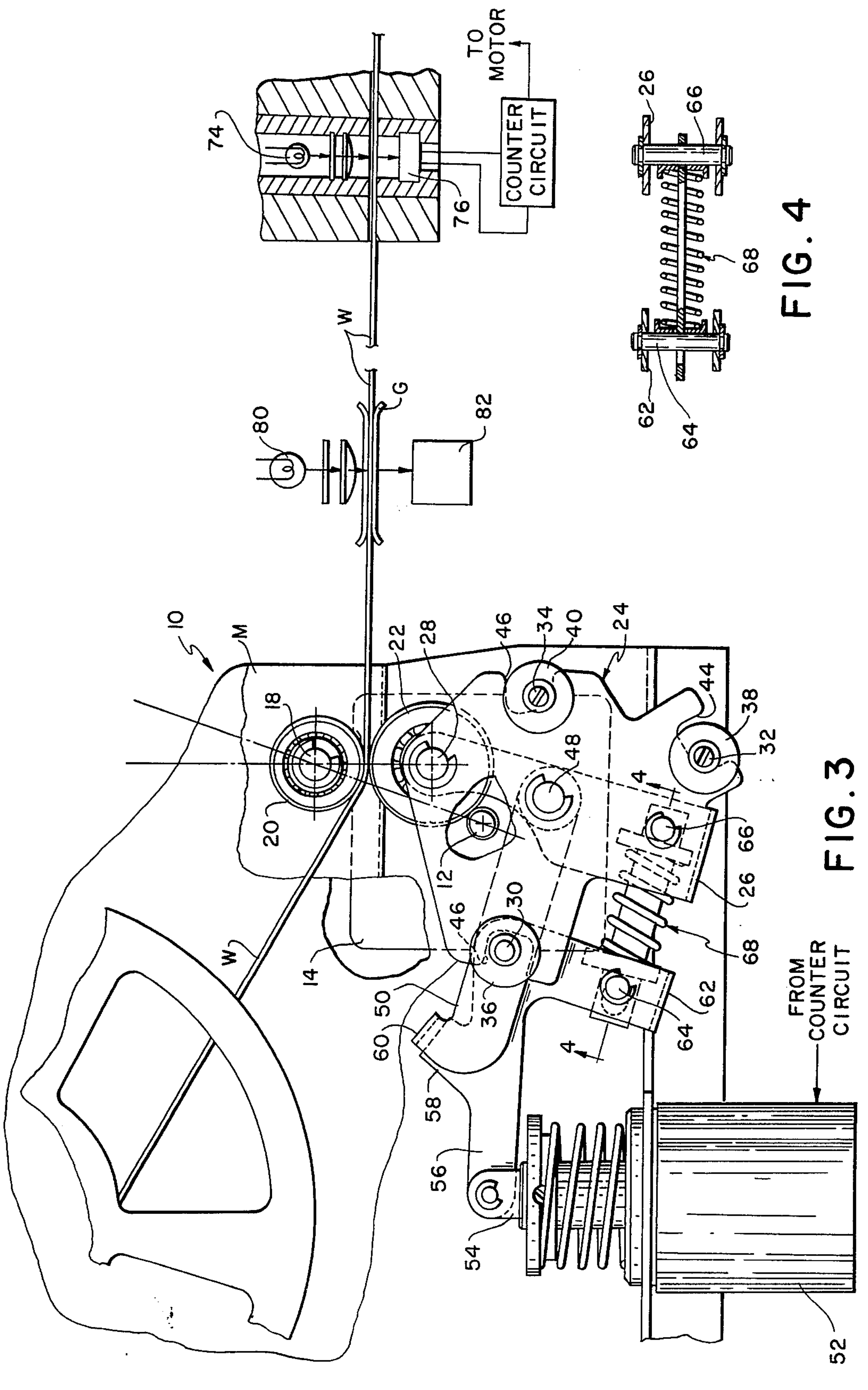
FIG. 3 is a side elevational view of the pinch roller/-capstan drive mechanism of FIG. 1 in a driving position.
FIG. 4 is a sectional view of the biasing mechanism of the pinch roller/capstan mechanism taken along lines 4—4 of FIG. 3.

Movement of the frame 24 is controlled by a solenoid 52 the armature of which (not shown) is connected by a link 54 to an actuating arm 56 mounted for rotation on the post 30. Integrally formed with the actuating arm 56 is a U-shaped channel 62 which carries a pin 64. The pin 64 cooperates with a similar pin 66 carried by the member 26 to support a biasing mechanism 68 (FIG. 4). The biasing mechanism 68 applies a spring force between the channel 62 and the frame 24 to urge counterclockwise rotation of the frame 24 about the post 30 and shaft 48. As will be discussed in more detail below, in order to establish the driving and non-driving positions of the pinch roller 22, the angular position of the frame 24 is controlled by a projection 58 on the arm 56, which, depending on the energization state of the solenoid 52, selectively mates with a tab 60 extending laterally from the lever 50.

Figure 2:
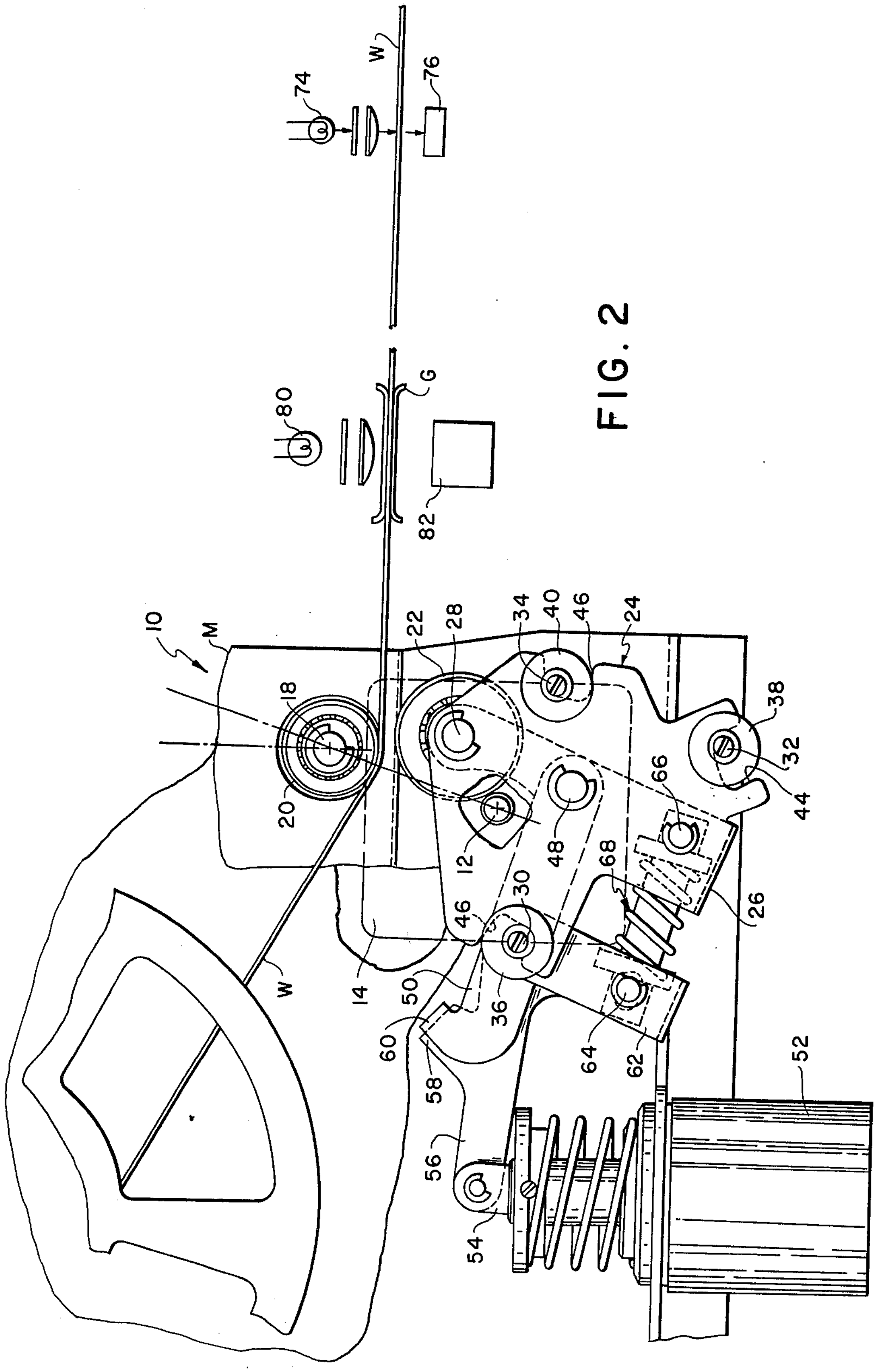
FIG. 2 is a side elevational view of the roller/capstan roller/ drive mechanism of FIG. 1 in a non-driving position.

In order to drive the web W, the drive mechanism 10 is moved from the non-driving orientation as seen in FIG. 2 to the driving orientation shown in FIG. 3 in the following manner. The solenoid 52 is energized to retract the link 54 thus pivoting the actuating arm 56 about the post 30. The channel 62, which, as noted above, is integral with the arm 56, will thus rotate in a counterclockwise direction (when viewed as in FIG. 3) and will apply an increased force to the frame 24 through the biasing mechanism 68. Projection 58 on actuating arm 56 will also move away from tab 60 on lever 50 so that the latter will now be free to rotate in a counterclockwise direction, constraining the frame 24 to rotate about the post 30 in the corresponding direction under the influence of biasing mechanism 68. The rotation of the frame 24 will bring the pinch roller 22 into a driving engagement with the web W by sandwiching the web between the roller 22 and the idler roller 20. Under the urging of the biasing mechanism 68, the frame 24 will concurrently rotate about the shaft 48 so as to maintain the pinch roller 22 in operative engagement with the capstan 12 at all times.

The relative location of the idler roller 20, pinch roller 22 and capstan 12 and their respective sizes are selected such that the biasing force applied to the frame 24 by the biasing mechanism 68 will result in a spring load force by the pinch roller 22, on the web W and idler roller 20 and the capstan 12, of generally equal proportions. As an illustrative example, the sizes of the rollers may be such that the idler roller 20 is three-quarters of an inch in diameter, the pinch roller 22 is one and one-eighth inches in diameter and the capstan is 0.257 inches in diameter.

With the drive mechanism 10 in the driving position of FIG. 3, the motor 14 (which as noted above is a stepper motor) will rotate the capstan 12 at a constant average rotational speed in a series of small incremental angular steps dictated by the constant frequency train of electrical pulses. The capstan 12 in turn will rotate the pinch roller 22 to provide a friction drive for the web W until it is desired to stop the web.

The particular orientation of the capstan 12, pinch roller 22 and idler roller 20, when in the driving configuration of FIG. 3, is selected such that on cessation of web drive any downstream tension inducing forces acting on the web, such as those generated by the web take-up or web inertia, which tend to pull the web past the rollers will increase the grip on the web W to prevent slippage. This increased grip is due to the fact that since the capstan is in a rotationally fixed position (held by motor 14), the pinch roller 22, as a result of the downstream forces, will tend to planetate about the capstan 12 to move in the direction of web travel about the capstan 12 into tighter pressure engagement with the web and idler roller 20. The pinch roller 22 is permitted this limited freedom of movement because of the capability of the frame 24 to move relative to the washer sets 36, 38 and 40 of the posts 30, 32 and 34. As an illustrative example, if the pinch roller 22, idler roller 20 and capstan 12 are of the size noted above, it has been found that best results are achieved if the relative locations of their axes is such that (with the parts in the FIG. 3 position) the angle formed by a line drawn from the axis of the pinch roller 22 to the axis of the capstan 12 is about 20° to the upstream side of a line drawn between the axes of idler roller 20 and the axis of the capstan 12.

To release the pinch roller 22 from driving engagement with the web W, the drive mechanism 10 is returned from the position shown in FIG. 3, to the position shown in FIG. 2. This is accomplished by de-energizing the solenoid 52 so that the link 54 is extended to pivot the actuating arm 56 in a clockwise direction (when viewed as in FIG. 2) about the post 30. The projection 58 on the arm 56 will engage the tab 60 of the lever 50 to pivot the arm about the post 30. The movement of the lever 50 will, in turn, move the shaft 48 and frame 24 downwardly (FIG. 2) so that the pinch roller 22 will be disengaged from the web 22. Since the biasing mechanism 68 is still effectively applying a counterclockwise urging force to the frame 24, the pinch roller 22 is maintained in engagement with the capstan 12.

In applying the principles of the drive mechanism 10 to the drive control of a strip of informational item bearing microfilm to accurately stop the movement of the microfilm such that a particular area of the film is in a projection gate G (FIG. 1), a signal representing the occurrence of the desired area of the film to be retrieved must be fed to the motor 14 control circuitry. This is accomplished by providing an identifying indicia 72 on the film adjacent each information bearing area and preselecting a specific indicia of a desired area to be positioned in the film gate G. While FIG. 1 shows the identifying indicia 72 as being an index mark in the web W to be sensed by an appropriate photo emitter 74 and a photo receptor 76, it is readily understood that any suitable type of identifying indicia may be used (as for example in previously mentioned U.S. Pat. No. 3,290,987). With the mechanism 10 in its drive orientation (FIG. 3) the drive motor 14 will rotate the capstan 12 to drive the pinch roller 22 until the preselected indicia 72 is sensed by the photo receptor 76 indicating occurrence of a desired information area. When the appropriate signal is received by the receptor 76, a signal will be generated and sent to a counter circuit 78 which will count out a specific number of electrical pulses to the stepper motor 14 depending upon the distance to be traveled between the point at which the indicia is sensed and the projection gate G. After receipt of the specific number of pulses, the motor 14 will be stopped and will accurately stop the film, since pinch roller 22 will have been rotated through a specific angle to give a precise linear travel to the film. As described above, subsequent downstream forces tending to move the film beyond its desired stopping point will increase the pinch roller pressure loading on the web to act as a brake on the film to prevent slippage.

From the foregoing it is apparent that there is herein provided a novel pinch roller/capstan drive mechanism which will drive and accurately stop a web. While the invention has been described in detail with reference to a preferred embodiment thereof, it will be understood that variations and modifications can be effected within the spirit and scope of the invention.

I claim:

1. Apparatus for driving a web along a predetermined path, said apparatus comprising: a first member movable between an operative web engaging and driving position adjacent said web path and a second position spaced therefrom, a second member located on the opposite side of said web path from said first member, said second member adapted to support a web interposed between said first and second members when said first member is in its operative position, drive means on the same side of said web path as said first member for selectively actuating said first member when said first member is in its operative position to drive said web, said first member being located along said web path, upstream of an imaginary line drawn between said drive means and said second member such that when said first member is in its operative position and said drive means is in a nonactuating condition any downstream tension inducing forces on the web will urge said first member toward said second member to accomplish a braking action on the web interposed therebetween.

2. The apparatus of claim 1 wherein said first member is a pinch roller and said second member is an idler roller.

3. The apparatus of claim 2 wherein said drive means includes a capstan operatively engaged with said pinch roller and a motor for selectively rotating said capstan.

4. Apparatus for controlling movement of a web along a predetermined path to stop a particular area of said web at a selected location, said web being of the type having a series of particular area identifying indicia, said apparatus comprising:

a pinch roller movable between an operative web engaging and driving position adjacent said web path and a second position spaced therefrom;

an idler roller positioned at the opposite side of said web path and adapted to sandwich a web between said pinch roller and said idler roller when said pinch roller is in its operative position;

drive means for selectively actuating said pinch roller to establish movement of said web when said pinch roller is in its operative position, said drive means including a capstan operatively engaged with said pinch roller and a motor for selectively rotating said capstan;

means adapted for scanning said web indicia and generating a signal upon detection of a preselected indicia indicative of a particular area of said web, said means being located a specific distance from said selected location;

means for receiving said signal and determining the further operating time of said motor after receipt of said signal whereby to stop said capstan at the end of such time, such time being correlated to the diameter of said capstan such that drive of said pinch roller from receipt of said signal by said signal receiving means to stoppage of said motor will result in linear movement of said web equal to the specific distance between said scanning means and said selected location; and further, when said pinch roller is in its operative position, the axis of said pinch roller will be parallel to the axes of said capstan and idler roller and upstream, relative to said web path, of an imaginary line drawn between the capstan and idler roller axes so that any downstream tension inducing forces on said web after the drive thereof has stopped will urge said pinch roller toward said idler roller.

5. Apparatus for driving a web along a predetermined path, comprising:

a support member positioned at one side of said path;

a web drive member mounted at the opposite side of said path for movement toward and away from said support member;

means for urging said drive member toward said support member into a position wherein, when a web is interposed therebetween, said drive member will be in frictional engagement with said web and will press said web against said support member; and drive means selectively activatable to actuate said drive member when in said position for driving said web along said path, said drive member being mounted such that said drive member is upstream, with respect to said web path, of an imaginary line drawn between said drive means and said support member whereby when said drive member is in said driving position and said drive means is inactive, tension in that portion of such web immediately downstream of said drive member relative to said web path will tend to increase the force urging said drive member toward said support member.

* * * * *